H. J. PASSMORE AND W. M. NEYLAND.
PLANTING ATTACHMENT FOR CULTIVATORS.
APPLICATION FILED MAR. 14, 1919.
1,333,505.
Patented Mar. 9, 1920.
3 SHEETS—SHEET 1.
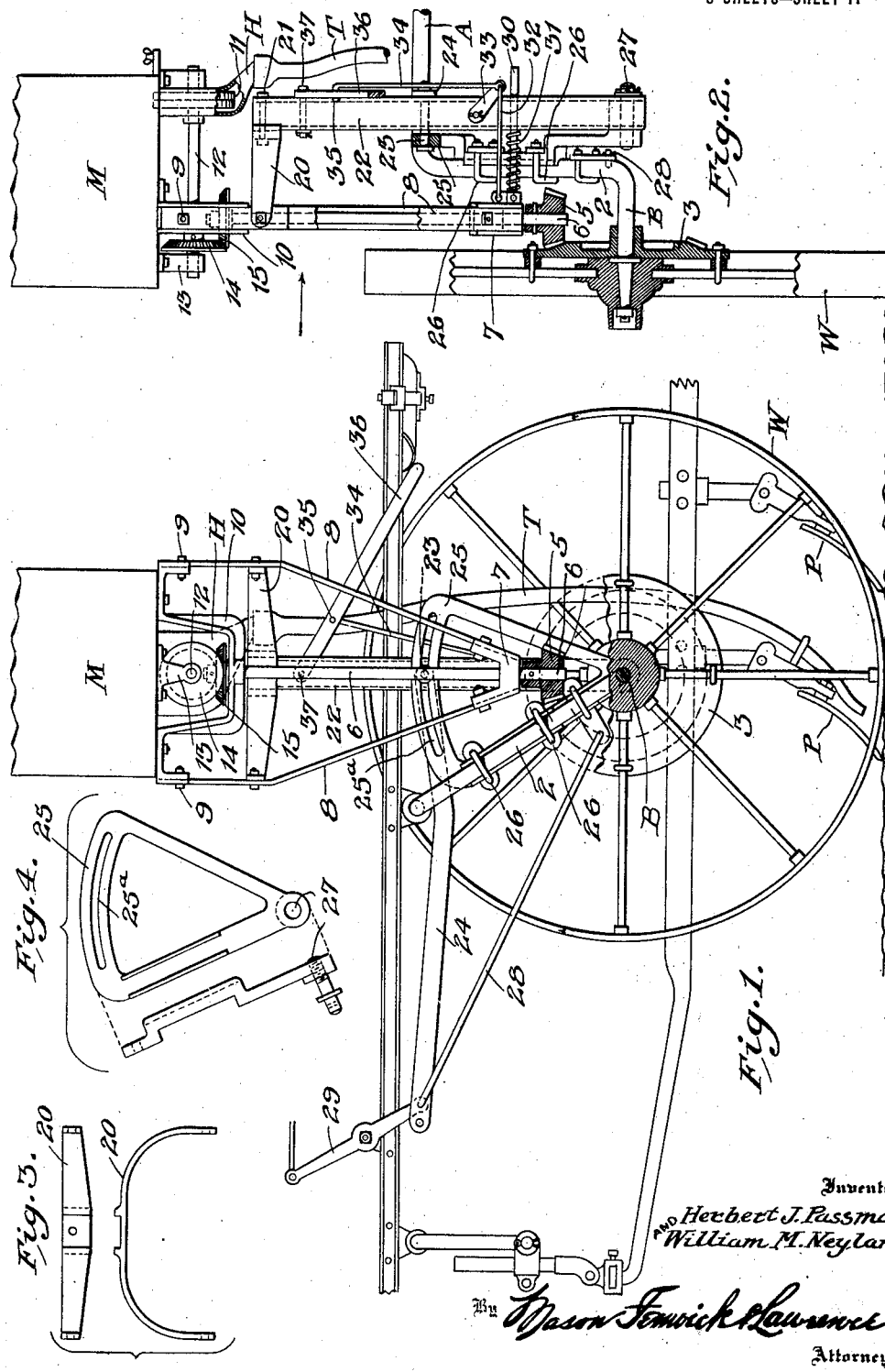

H. J. PASSMORE AND W. M. NEYLAND.
PLANTING ATTACHMENT FOR CULTIVATORS.
APPLICATION FILED MAR. 14, 1919.
1,333,505. Patented Mar. 9, 1920.
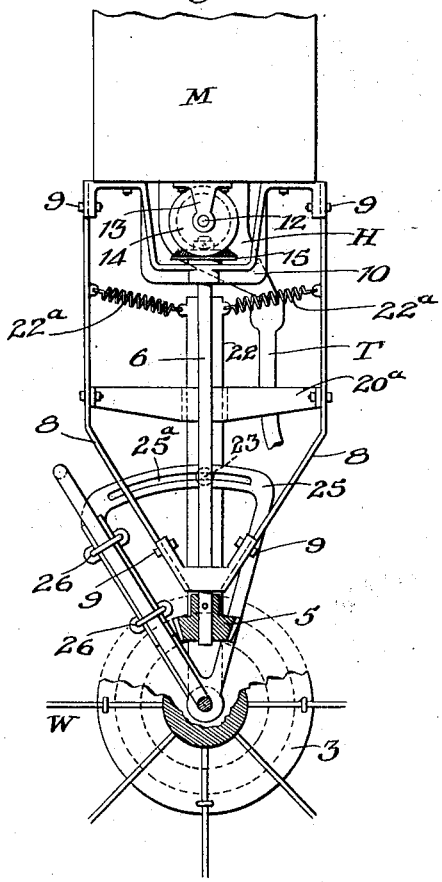
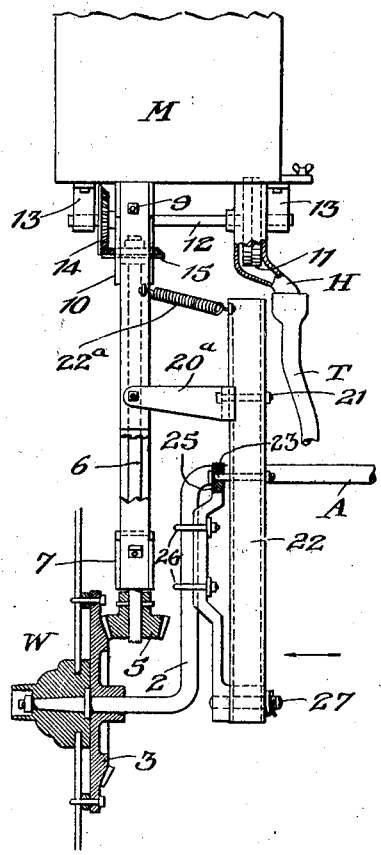
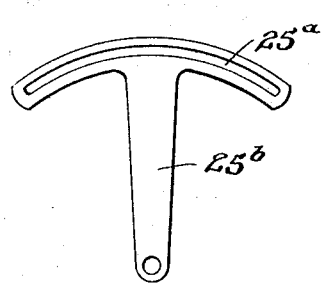
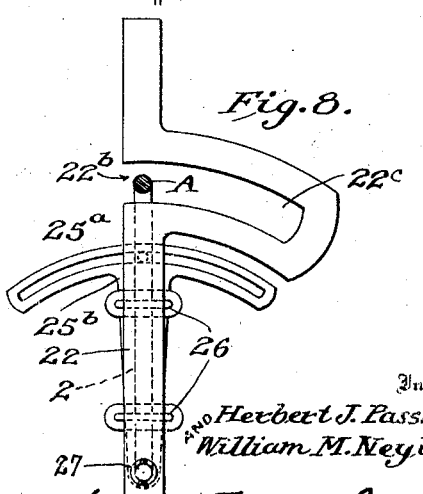
Inventors
Herbert J. Passmore
William M. Neyland

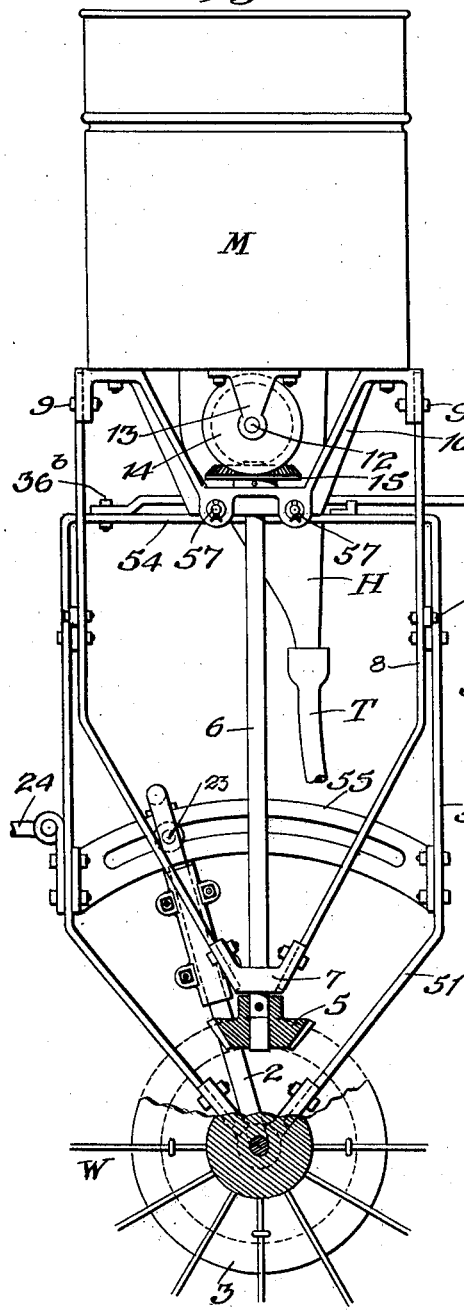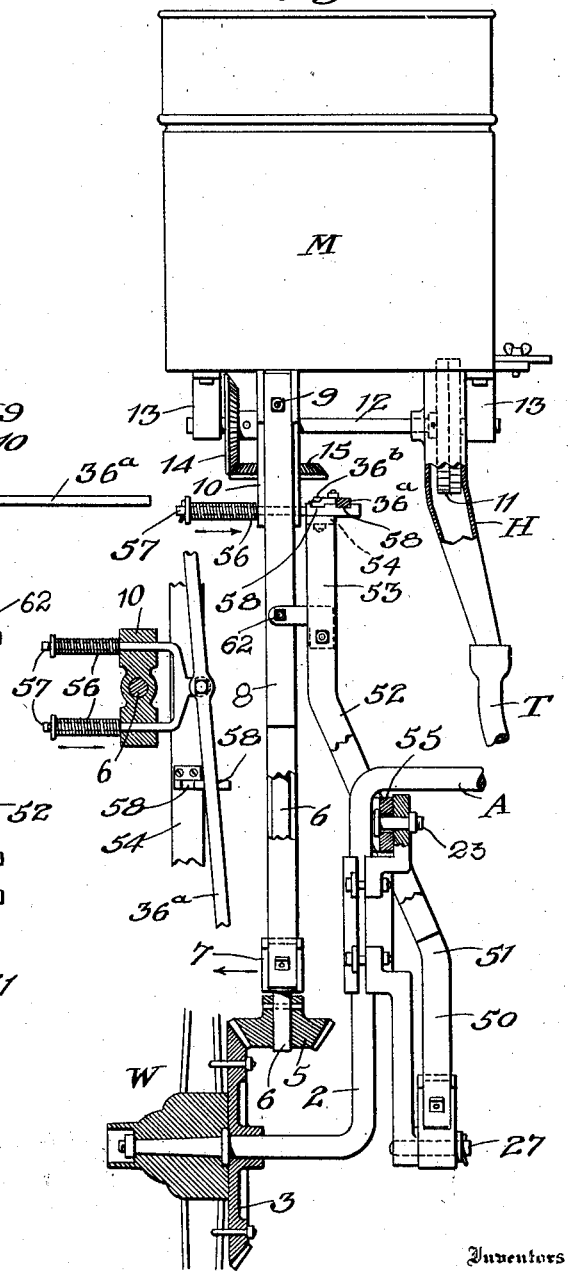

UNITED STATES PATENT OFFICE.

HERBERT J. PASSMORE AND WILLIAM M. NEYLAND, OF GOLIAD, TEXAS.

PLANTING ATTACHMENT FOR CULTIVATORS.

1,333,505.  Specification of Letters Patent.  Patented Mar. 9, 1920.

Application filed March 14, 1919. Serial No. 282,627.

*To all whom it may concern:*

Be it known, that we, HERBERT J. PASSMORE and WILLIAM M. NEYLAND, citizens of the United States, residing at Goliad, in the county of Goliad and State of Texas, have invented certain new and useful Improvements in Planting Attachments for Cultivators; and we do hereby declare the following to be a full, clear, and exact description of the invention, such as will enable others skilled in the art to which it appertains to make and use the same.

This invention relates to attachments to cultivators and particularly to attachments enabling the planting of seeds when the cultivator is being operated.

It is one of the objects of the present invention to provide a substantially unitary or completely organized planting or replanting attachment capable of being readily applied to an appropriate or given type of cultivator without necessitating the change in construction of or machining upon the standard cultivator for which it may be designed and constructed for attachment and coöperation. It is another object of the present invention to provide a planting and replanting attachment having means operative by the power mechanism of the cultivator to control the discharge of the seeds being planted from a container or receptacle. It is another object of the present invention to provide a seed planting attachment for cultivators which is so designed, constructed and arranged that the planter organization will be maintained substantially at all times in a perpendicular or upright position irrespective of the angle to which the axle arch is set or shifted for weight equalization such as is now commonly practised in the operation of several types of cultivators. It is another object of the invention to provide means in combination with a standard cultivator or in combination with a cultivator of a given or desired type and construction for actuating certain moving elements of the planter mechanism by power derived by the cultivator wheel. A further object of the invention is to provide for the mounting of certain elements of the planter in such manner that the force of gravity will be utilized to hold said operating mechanism in coöperative relation in opposition to tendency of the parts to become disengaged from various causes during the operation of the cultivator. It is another object of the invention to provide a means for readily disconnecting the coöperating driving mechanism of the planter discharge means from operative association with the driving element thereof as for instance from the correlative cultivator wheel.

It is further an object of the invention to provide automatically operated seed control and discharging means with a delivery device whereby the seed to be planted will be discharged substantially just behind one of the ground engaging and cultivating elements as for instance a plow and so that the planted seed will be covered by an adjacent and following plow.

With these and numerous other objects in view such as will readily disclose themselves to those expert in this art the invention consists in the construction, the combination, and in details and elements of parts forming as a whole a planting or replanting attachment for cultivators and further resides in the combination with a cultivator of suitable type or style or construction of a planting and replanting attachment and involving means for automatically operating the discharge mechanism of the planter through connections with a part of the harrow. The invention involves an organization of elements and the combination as above suggested and in its several features is described in the following specification with relation to the embodiments of the invention shown in the accompanying drawings in which:

Figure 1 is a side elevation and partial sectional view of a form of cultivator, which is illustrated diagrammatically, to which the attachment is shown applied.

Fig. 2 is a rear elevation of parts of the cultivator to which the planter is shown as applied, certain of the parts being broken away for the purpose of clearness.

Fig. 3 is a group view showing in detail the construction of a bracket or a journal arm of the planter.

Fig. 4 is a group view showing in detail the construction of the tilting segment.

Fig. 5 and 6 illustrate a modified form of supporting means for the planting attachment.

Figs. 7 and 8 show a variant form of the frame and the support.

Fig. 9 and 10 show inside and end elevations of a preferred form of the improved distributing attachment.

In the adaptation of our invention as illustrated in Figs. 1 and 2, a planting organization or attachment which forms, substantially, a complete unit is shown as arranged on the left-hand side of the cultivator and is therefore disposed so as to be entirely out of the way of the cultivator mechanism and in a position which does not interfere with the operation of the shifting of the plows vertically or horizontally and does not interfere with the operator's view during the operation of the cultivator. In the form of the attachment shown it is designed to be connected to the upright arm 2 of the usual U-shaped straddle axle generally indicated at A having the out turned axle parts to receive wheels at W to the left one of which is shown attached a driving gear 3, in the form of a bevel gear which may be fastened by suitable clip bolts or other means to the wheel, in this case the bolts being applied to the spokes of the wheel (see Fig. 2). Engageable with the upper portion of the toothed face of the beveled gear 3 is a complementary pinion 5 which is fastened as by pinning or otherwise on the lower end of a shaft 6 which passes through a bearing 7 shown in Fig. 1 as approximately V-shaped and having on its outer sides divergent brackets 8 extending upwardly and being suitably secured as by bolts 9 to an upper shaft-bearing in the form of a U-shaped frame 10 upon the out turned upper ends of which is suitably secured a seed box or magazine M in which may be arranged any suitable form of seed discharge mechanism preferably of the type involving an operating mechanism which is engaged by a wheel 11 secured on a transverse shaft 12 mounted in end bearings 13 secured on the bottom of the magazine M. On this shaft 12 there is a gear 14 engaging a gear 15 fixed on the upper portion of the shaft 6 so that when the latter is driven by reason of the engagement of the pinion 5 with the gear wheel 3 fast on the cultivator wheel W the seed mechanism in the magazine is actuated so as to cause the discharge of seed therefrom into a spout, Fig. 2, associated with which there is a hopper H having a tube at T extended downwardly and secured conveniently in a position just in the rear of one of the plows P so that the seeds being planted are located in the plow furrow and a following plow then serves to throw over a sufficient quantity of dirt to effectually cover the seed.

One of the important objects of the present invention is to hold the planting mechanism so that the magazine M will be maintained substantially constantly with its shaft 6 in a vertical position and to secure this and also to enable the ready connection of the attachment to a cultivator the upper bearing or frame 10 above referred to is connected to an upper yoke or hanger 20 by means of bolts passing through the side members 8—8 of the frame work extending upwardly from the bearing 7. The bolts just referred to form pivotal supports or connections between the magazine frame 8, and the bracket or hanger 20 which is fastened by bolts 21 or otherwise to the upper end of a post 22. The post 22 is perforated at a suitable point in its length to receive a fastening pin or bolt 23 which also passes through the end of a link 24, to be described hereafter, and through the upper segmental portion of a frame 25. The frame 25 is shown as rigidly secured by any suitable means as U-clips 26 to the usual inverted U-shaped axle A above referred to. The segmental portion of the fastening frame 25 is provided with an arcuate slot 25$^a$, in which the pin 23 plays, concentric with the spindle B of the axle with which there is coaxially alined a pivot pin or trunnion 27 passing through the lower end of the post 22 and being fixed in the convergent portion or hub of the frame 25.

From the mechanism above described it will be seen that the main frame 25 of the unit is designed to be tilted about its pivot trunnion 27 concurrently with the swinging of the axle arms 2 of the wheel axle when the latter is adjusted as by means of a link 28 which is connected to a lever arm 29 suitably mounted on the frame of the cultivator: the link 24 operating during the shifting movement of the link 28 to relatively change the position of the post 22 so as to hold it vertically above the axis of the wheels and above its own axis at the pivot 27.

While we have thus provided means for keeping the post 19 with the driven axle 6 and the magazine M in a substantially vertical position irrespective of the angle of the arms 2 of the axle, we have also provided means for keeping the pinion 5 normally in engagement with its driving gear 3 irrespective of the path of travel of the wheels and said means shown as comprising a yielding connection between the lower end of the shaft bearing and the adjacent portion of the post 22. A simple form of this yielding connection comprises a pin 30 extending from the bearing 7 and passing through the post 22, which pin is surrounded by an expansion spring 31 normally acting to thrust the frame 8—8 with its shaft and the pinion 5 outwardly so that the latter is constantly held in engagement with its driving gear.

However, it is obvious that it is desirable at certain times to interrupt the automatic action of the planting mechanism and this is secured through a suitable manually controlled mechanism involving a link 32 connected at one end to the bearing 7 and at its outer end, if desired, to a lever or guiding member 33 to which or to the link as may be desired there is attached a further link 34 the upper end of which is connected at 35 to an operating lever 36 pivoted at 37 on the post 22. When it is desired to disengage the driving mechanism from the cultivator wheel it is only necessary for the operator to grasp the lever 36 and pull it upwardly with the result that the lower portion of the frame 8—8 and pinion 5 will draw away from the driving gear 3 against the reaction of the spring 30 which tends to normally thrust the gears into mesh.

A somewhat modified form of the attachment is shown in Figs. 5 and 6 in which the post 22 is connected at its upper end by springs 22$^a$ to the side arms of the frame 8—8 and the yoke 20$^a$ is shown as secured somewhat below the top of the post and is extended outwardly to be pivotally connected with the frame 8—8 in the manner as above described. In this modification as clearly seen in Fig. 8, the post 22 is provided with a deflected arcuate portion 22$^c$ having a throat 22$^b$ to receive the cross shank of the axle A. The main carrying or supporting frame as illustrated at 25$^b$ is also modified over the form shown in Figs. 1 and 2 and is substantially T-shaped in outline and has its slot 25$^a$ concentric with its hub portion as above described and the central or stem portion of the frame 25$^b$ is fastened by clips 26 to the arm 2 of the axle.

In Figs. 9 and 10 there is clearly illustrated the preferred embodiment of our invention and in these figures the same general purpose is involved in the construction and operation of the parts but they are altered in design and construction as will be clearly seen. Instead of using a hanger in the form of a frame 25 Fig. 1, the hanger in Figs. 9 and 10 is illustrated at 50 as comprising an arm or substantial piece extending along and clamped to the axle arm 2 the upper and lower portions of the hanger or part 50 being offset inwardly from the crank arm and at the lower end of the latter is the trunnion 27 on which is pivotally mounted a frame 51 diverging outwardly from its lower portion and thence also being deflected forwardly as at 52 where it passes in front of the crank arm 2 and thence extends upwardly as at 53 where it is provided with a top or cross piece 54, Fig. 9. At the upper portion of the frame part or hanger 50 there is arranged the bolt 23 which extends through a slotted arcuate segment 55 the ends of which are secured as by bolts or other means to the adjacent sides 52 of the frame 51. Mounted on the end of the pin 23, Fig. 10 is the adjacent end of an adjusting link 24, the same as shown in Fig. 1 by means of which the frame 51 may be held in a substantially vertical position while the angle of the axle arm 2 is varied as before stated. In this embodiment of the invention the pinion 5 engages the driving gear 3 and is secured on the lower end of the upright shaft 6 which passes through the lower bearing 7 and thence upwardly through the suitable form of the bearing 10 which is connected to the upper portion of the frame 8 extending upwardly from the bearing 7 and which frame is pivoted by bolts or other suitable means 62 in or on forwardly extending brackets or parts of the upper portion 53 of the frame which swings on the trunnion 27 so that the frame 8 with its shaft 6 can be swung toward or from the driving gear 3 to engage or disengage the pinion 5 therewith. For the purpose of yieldingly maintaining meshing engagement between the pinion 5 and its driving gear 3 irrespective of any wabbling of the gear 3 with the cultivator wheel to which it may be attached, in this form of the invention there is utilized resultant means comprising a pair of springs 56 each mounted on a respective arm 57 of a U-shaped bolt or other member which passes through the lower portion of the upper bearing 10 and is connected as shown in Fig. 10 to the adjacent portion of an operating lever 36$^a$ which in the present instance is shown as pivoted, at one end to the cross piece 54 at the top of the frame 50 as by a bolt 36$^b$. In order to secure a locking of the operating lever 36$^a$ in either of its positions as for instance in the position shown when the lever 36$^a$ is thrown inwardly to contract the springs 56 and thus draw the upper portion of the shaft 6 and the frame 8 thereof over and force the pinion 5 into mesh with its gear 3, a notched bar 58 is provided into which the adjacent portion of the lever 36$^a$ can be seated as desired. It will be seen that while the lever has been set to compress the springs 56, these will act yieldingly and automatically to maintain the pinion 5 in mesh with the gear 3 and when it is desired to disconnect the discharge or escapement mechanism so as to prevent its operation then the operator releases the shaft 36$^a$ so that the springs can expand and the pinion 5 forced out of engagement with its driving gear 3.

Obviously our invention may be readily adapted not only for the discharge of seed of various kinds such for instance as corn or cotton or other crops but also may be readily adapted to the discharge of any suitable fertilizer or in fact any other material in which implements of this nature might be practically employed and therefore we have not specifically described any given or preferred type of discharge mechanism controlling the escape of the material being discharged from the magazine M.

What we claim is:

1. The combination with a wheeled cultivator, of a driver attached to one of its wheels, a magazine and its discharging mechanism mounted on the cultivator, and driving means for said mechanism constructed and arranged to be engaged with and disengaged from the said driver, and means for maintaining the magazine constantly in a substantially vertical position irrespective of the adjustment of its supporting connection with the cultivator.

2. The combination with a wheeled cultivator, having a cranked axle on the ends of which the wheels are mounted and having means for varying the angle of the crank arms; of a frame attached to one of the arms and having a trunnion co-axial with the wheel spindle, a support pivoted on the trunnion and carrying a magazine with discharging mechanism and means for effecting the adjustment of the support with respect to the axle when the latter is adjusted so as to keep the magazine vertical.

3. The combination with a wheeled cultivator, having a cranked axle on the ends of which the wheels are mounted and having means for varying the angle of the crank arms; of a frame attached to one of the arms and having a trunnion co-axial with the wheel spindle, a support pivoted on the trunnion and carrying a magazine with discharging mechanism and means for effecting the adjustment of the support with respect to the axle when the latter is adjusted so as to keep the magazine vertical, and manually controlled means for coupling the discharging mechanism to one of the wheels so that the seeds are discharged while the cultivator is in, and by its, motion.

4. The combination with a wheeled cultivator, having a cranked axle on the ends of which the wheels are mounted and having means for varying the angle of the crank arms; of a frame attached to one of the arms and having a trunnion co-axial with the wheel spindle, a support pivoted on the trunnion and carrying a seed magazine with discharging mechanism, and means for effecting the adjustment of the support with respect to the axle when the latter is adjusted so as to keep the magazine vertical, a drive mechanism and manually controlled means for coupling the discharging mechanism to one of the wheels, so that the seeds are discharged while the cultivator is in, and by its motion, the control means, the driving means and the magazine being pivotally mounted on the support.

5. The combination with a wheeled cultivator, having a cranked axle on the ends of which the wheels are mounted and having means for varying the angle of the crank arms; of a frame attached to one of the arms and having a trunnion co-axial with the wheel spindle, a support pivoted on the trunnion and carrying a seed magazine with discharging mechanism, and means for effecting the adjustment of the support with respect to the axle when the latter is adjusted so as to keep the magazine vertical, a drive mechanism and manually controlled means for coupling the discharging mechanism to the drive mechanism so that the seeds are discharged while the cultivator is in, and by its motion, the control means, the driving mechanism and the magazine being pivotally mounted on the support.

6. A discharging attachment for a wheeled cultivator comprising a hanger attachable to one of the crank arms of the axle of the cultivator and having a trunnion to be co-axially alined with the wheel spindle of the arm to which the hanger is attached, a supporting frame pivotally mounted on the trunnion and deflected forwardly on each side of the crank arm, a slotted arcuate segment connected to the said frame and movably connected with the hanger member; a carrying device pivotally mounted on the frame and provided at its upper end with a magazine having a discharging magazine, a shaft journaled on the carrying device to pivot therewith and adapted to be rotated when coupled to a wheel of the cultivator, the shaft having at its upper end means for actuating the discharging mechanism of the magazine, and means for yieldingly maintaining the engagement of the driving mechanism of the shaft with respect to the cultivator wheel so as to follow its undulations, and means manually operated to engage or disengage the shaft from the driving wheel.

7. A discharging attachment for a wheeled cultivator comprising a hanger attachable to one of the crank arms of the axle of the cultivator and having a trunnion to be co-axially alined with the wheel spindle of the arm to which the hanger is attached, a supporting frame pivotally mounted on the trunnion and deflected forwardly on each side of the crank arm, a slotted arcuate segment connected to the said frame and movably connected with the hanger member; a carrying device pivotally mounted on the frame and provided at its upper end with a magazine having a discharging magazine, a shaft journaled on the carrying device to pivot therewith and adapted to be rotated when coupled to a wheel of the cultivator, the shaft having at its upper end means for actuating the discharging mechanism of the magazine, and means for yieldingly maintaining the engagement of the driving mechanism of the shaft with respect to the cultivator wheel so as to follow its undulations, and means manually operated to engage or disengage the shaft from the driving wheel, said yielding means comprising a sliding device connected to the frame and carrying compression springs normally acting to tilt the shaft on its pivot, and a lever connected to said device for releasing or compressing the springs.

8. The combination with a wheeled cultivator, having a cranked axle on the ends of which the wheels are mounted and having means for varying the angle of the crank arms; of a frame attached to one of the arms and having a trunnion co-axial with the wheel spindle, a support pivoted on the trunnion and carrying a seed magazine with discharging mechanism, and means for effecting the adjustment of the support with respect to the axle when the latter is adjusted so as to keep the magazine vertical, and manually controlled means for coupling the discharging mechanism to one of the wheels so that the seeds are discharged while the cultivator is in, and by its motion, the control means and the magazine being pivotally mounted on the support.

In testimony whereof we affix our signatures.

HERBERT J. PASSMORE.
WILLIAM M. NEYLAND.